United States Patent

[11] 3,562,627

[72] Inventors James H. Galloway
Cato, N.Y.;
Frank W. Gutzwiller, Erie, Pa.; E. Keith
Howell, Skaneateles, N.Y.
[21] Appl. No. 724,748
[22] Filed Apr. 29, 1968
[45] Patented Feb. 9, 1971
[73] Assignee General Electric Company
a corporation of New York

[54] LOW HYSTERESIS FIRING CIRCUIT FOR SOLID STATE SWITCH
4 Claims, 5 Drawing Figs.

[52] U.S. Cl. .... 323/16, 323/24, 323/36
[51] Int. Cl. .... G05f 3/04
[50] Field of Search .... 307/252, 297 (Cursory), 305A; 321/45 (DT); 323/22 (SCR), 16, 24, 36, 19

[56] References Cited
UNITED STATES PATENTS

| | | | |
|---|---|---|---|
| 3,296,498 | 1/1967 | Chassanoff et al. .... | 307/252X |
| 3,424,948 | 1/1969 | Ravas .... | 307/252X |

OTHER REFERENCES

Spofford, W. R., " Thyristor Triggering," ELECTRONIC DESIGN, Aug. 30, 1966, pgs. 38— 42, (Copy in 307—305A).

*Primary Examiner*—William M. Shoop, Jr.
*Assistant Examiner*—A. D. Pellinen
*Attorneys*—Paul E. Rochford, David M. Schiller, Frank L. Neuhauser and Oscar B. Waddell

ABSTRACT: A firing circuit for control of AC power through a gated solid-state power control is provided employing a single series connected RC network having variable resistance in parallel with the power control and a series connected SBS and Zener diode to connect the junction of the RC network to the gate of the gated power control.

INVENTORS,
JAMES H. GALLOWAY,
FRANK W. GUTZWILLER,
E. KEITH HOWELL
BY Paul E. Rochford
ATTORNEY INVENTORS,
JAMES H. GALLOWAY,
FRANK W. GUTZWILLER,
E. KEITH HOWELL
BY Paul E. Rochford
ATTORNEY

LOW HYSTERESIS FIRING CIRCUIT FOR SOLID STATE SWITCH

The present invention relates to devices for controlling the supply of alternating current electric power to a resistive load such as an electric lamp. More particularly, the present invention relates to devices particularly well adapted for low cost fabrication with thick film and integrated circuit techniques for control of supply of electric power.

Solid-state switching devices, and circuits incorporating such devices adapted for use in the control of electric power, have been provided at progressively lower cost as the state of this art advances. In order to reach progressively lower cost levels in furnishing power control units or devices incorporating solid-state switches to the public, the number of auxiliary components such as resistors, capacitors, diodes, and the like which are conventionally incorporated in such circuits has been progressively minimized or the components used have been of progressively lower cost in the sense of having lower tolerance components, i.e., components having values within a broader range of possible variation. Also to improve performance with components of lower tolerance "trimming" steps are sometimes employed. Trimming involves adjustment of component value or values after a circuit has been formed from a particular set of components to give the adjusted components the best component value for that specific circuit. Such trimming adjustment amounts to a post-assembly operation and, although performed only once, adds cost to the assembly and fabrication. Trimming has the effect of increasing labor costs which can in part offset a reduction in parts costs. Trimming can only partly offset the variation of component values with time or "drift" of such values of lower cost components. The components affected are those used to make the solid-state switch operate responsive to changes of the phase angle of an RC subcircuit and include the resistance and capacitance of the RC subcircuit.

The components have been reduced to the point where performance of the power control devices having low cost is erratic in the sense that the relationship between the movement of a control element, such as the turning of a manual control knob, and changes of the level of power supplied through the solid-state switch of the circuit controlled by the manual element is far from linear.

Use of combinations of elements which have been furnished heretofore at low cost can have the undesirable effect of concentrating the changes in power levels into a short range of movement of the manual control element. Particularly, nonlinear relationships are found together with a "pop-on" type of performance as the user manipulates the manual control element to change the level of power furnished to a load responsive to alteration of the resistance value of a variable resistance of the triggering subcircuit. Also, the power level supplied to the load can follow a hysteresis type of path as the resistance value is changed to raise or reduce the levels of power passing through an associated solid-state power control device.

One scheme which offers an opportunity to improve the performance of power control circuits without significantly increasing the cost of such circuits is the so-called thick film technique by which a number of passive circuit elements can be added at comparatively small incremental cost for the addition of each component of the circuits. The thick film technique offers the advantage, therefore, of permitting production of power control devices having high performance capabilities with a disproportionately small increase in the cost of the device for the addition of individual passive components.

Similarly, where the volume of circuits to be produced is sufficiently high to justify the expense of developing a fabricating capability, and where the nature of the components is compatible, passive elements can be included with power control elements to yield high performance circuits by the monolithic or integrated circuit technique according to which the passive components and circuit connections are formed integrally with and simultaneously with the solid-state power control element. However, not all combinations of elements are suitable for formation into integrated circuits.

One problem which attends the efforts to reduce the number of components in a solid-state control circuit is the need for trimming or calibration of the components incorporated in the control device to overcome variations in line voltage from a prescribed norm. A circuit which is subject to pop-on due to its following a hysteresis path of illumination relative to control knob movements can be set at an illumination level below the pop-on level by positioning the control knob to a lower level after first exceeding the pop-on level. However, variations in line voltage can cause the lamp to pop-off particularly as the result of a temporary line voltage dip which frequently attends the turning on of an appliance or the like energized from the same line which supplies power to the pop-on lamp circuit. This pop-off occurs usually when the line voltage drops for at least a single cycle of the AC power energizing the lamp. Such a pop-off can be dangerous, of course, where the lower level of power supply established by a low setting of the control element of the circuit is used for safety purposes as for illuminating a stairwell during the night or for similar purposes where only a relatively low level of illumination is needed.

It is accordingly an object of the present invention to provide a low cost solid-state power control device having high performance capabilities, particularly greatly reduced hysteresis.

It is a second object of the present invention to provide a device having greater reliability of performance due to a lower level of stress on the component parts particularly a reduced stress on the capacitor element of the circuit.

An additional object of the present invention is to provide a power control device having a minimum number of components consistent with low hysteresis performance.

Another object is to provide a device adapted to manufacture in thick film or at least partially in integrated circuit form.

Still another object is to provide a solid-state power control device of small overall dimensions and at reduced cost.

Additional objects and advantages of the present invention will be in part apparent and in part pointed out in the description which follows.

In one of its broader aspects the objects of the present invention are achieved by providing a firing subcircuit for a gated solid-state switch adapted to the continuous control of alternating current power over a wide power range, said circuit including a series connected capacitor and variable resistance as an RC network, said network being connected in parallel across the lines supplying power through said solid-state switch, and the junction of said network being connected to the gate of said gated switch through a series connected bidirectional trigger device and a Zener diode.

The novel circuitry of the present invention and the advantageous operation obtained therefrom will be better understood by reference to the accompanying drawing in connection with the description which follows in which.

Figure 2:
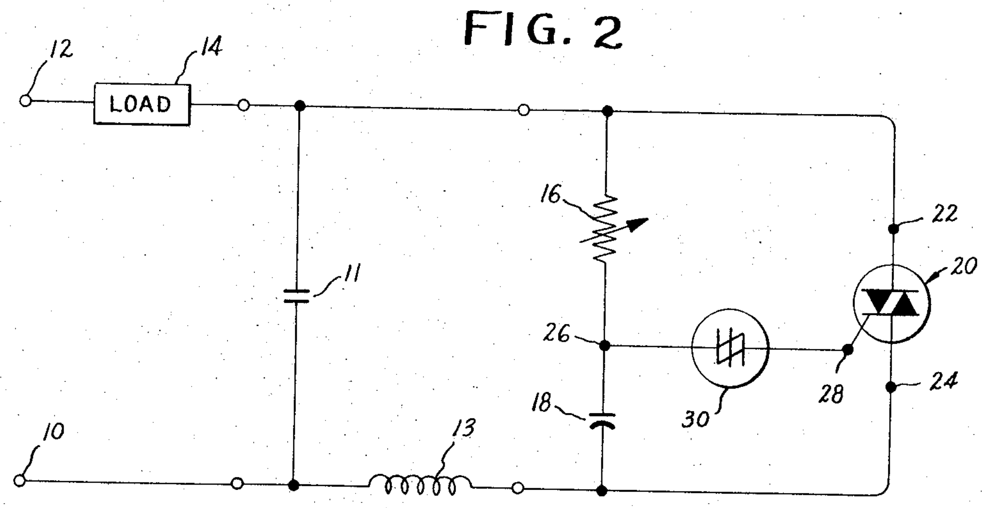
FIG. 2 is a circuit diagram of a circuit similar to that of FIG. 1 but with the Zener diode element omitted.

Referring now specifically to FIG. 2, alternating current power is supplied across the electrodes 10 and 12 from a source not shown to the load 14 through a solid-state power control device or switch 20, which may be for purposes of illustration a triac.

In FIG. 2 control of the firing of the triac 20 is furnished by the RC network consisting of a series-connected variable resistance 16 and capacitor 18 which network is connected in parallel with the electrodes 22 and 24 of the solid-state switch 20. The junction 26 of the RC network is connected to the gate electrode 28 of the solid-state switch 20 through the bidirectional switching device, illustratively described and shown as a silicon bilateral switch designated herein also as SBS 30.

A conventional coil 13 for suppression of radio frequency emission and capacitor 11 may be included in the circuit for improved overall operation.

The SBS is a device as described in the Aug. 30, 1966 issue of ELECTRONIC DESIGN the disclosure of which is incorporated herein by reference and this device provides a symmetrical bidirectional triggering function.

The SBS is also the subject of a copending application for Pat. of Thomas C. Mapother, Ser. No. 509,700 filed Nov. 26, 1965, now U.S. Pat. No. 3,427,512, and assigned to the owner of the present application.

Figure 3:
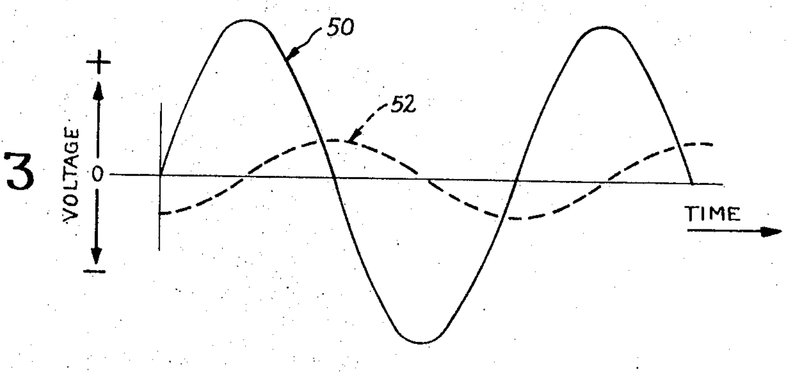
FIG. 3 is a superimposed graphic representation of a line voltage power wave impressed on the power control device and the voltage on a capacitor of the circuit shown as ordinate plotted against time as abscissa.

Referring now to FIG. 3, a plot is shown of the normal sine wave 50 of the voltage impressed on the circuit elements by an alternating current line power source not shown. The line voltage is seen to progress with time through the normal sine curve. In the absence of firing of the SBS element 30 the voltage impressed on condenser 18 is indicated by the dashed line 52 of FIG. 3 and, as is evident, is approximately 90° out of phase with the line voltage. The time from the start of the sine curve to completion of one full cycle is the conventional one-sixtieth of a second of conventional alternating current power supplies.

Figure 4:
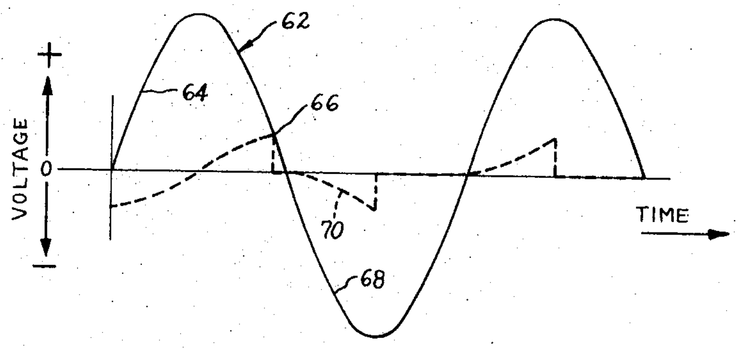
FIG. 4 is a plot similar to that of FIG. 3 showing the change with time of the capacitor voltage when the trigger circuit starts operating without the Zener diode.

Referring now to FIG. 4, the dashed line plot is that of the voltage 62 at capacitor 18 as the line voltage is applied to the circuit of FIG. 2 with resistance 16 reduced to the point where the SBS firing point is just reached. The initial positive wave 64 of the line voltage will be seen to cause an increase in the capacitor voltage from an initial value as shown in FIG. 3 to a point 66 where the SBS breakdown has just been reached, allowing the capacitor to discharge through the SBS to fire the solid-state switch. When the SBS fires, the capacitor voltage drops, as shown, to near zero and, as the negative cycle 68 of the alternating current starts the capacitor voltage will also be effectively at zero.

Accordingly as the line voltage 68 decreases, the buildup of corresponding voltage 70 on the capacitor will be from a zero voltage rather than from a positive voltage value such as that shown in FIG. 3 at the same point and will cause an effective premature firing of the SBS. This premature firing occurs when the voltage on the capacitor 18 reaches a value greater than the breakdown voltage of the SBS. This premature firing is the cause of the so-called pop-on operation of the solid-state switch 20. As is also evident from FIG. 4, the voltage on the capacitor will at this point return to zero so that its condition at the start of the next positive cycle will also be a near zero voltage and the pop-on initiation of conductivity through switch 20 will occur also in the second positive cycle for the reasons stated for the negative half-cycle, and in all subsequent half-cycles.

Figure 1:
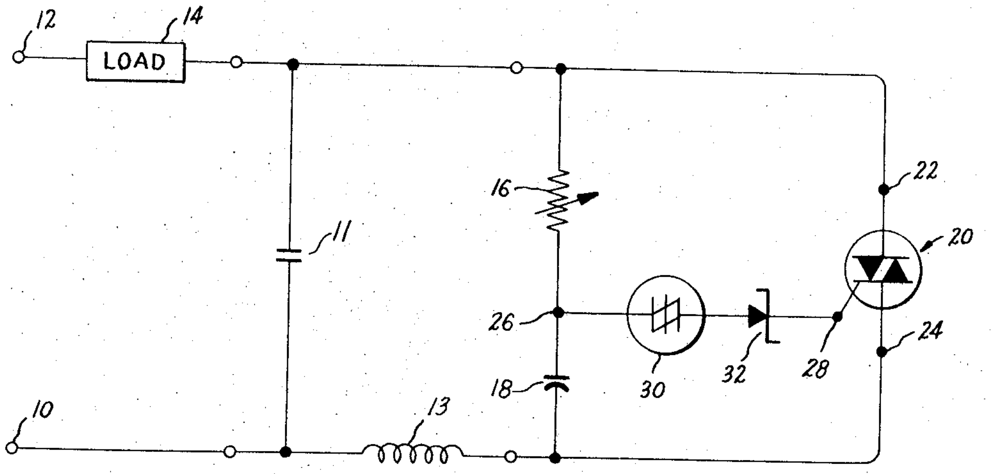
FIG. 1 is a circuit diagram of a circuit in accordance with the present invention.

Turning now to FIG. 1, the circuit provided in accordance with this invention will be seen to be similar to that shown in FIG. 2, with like numerals indicating like circuit elements, with the one exception that a Zener diode 32 has been included in the line between the bidirectional trigger device, illustrated as an SBS 30 and the trigger electrode 28.

Figure 5:
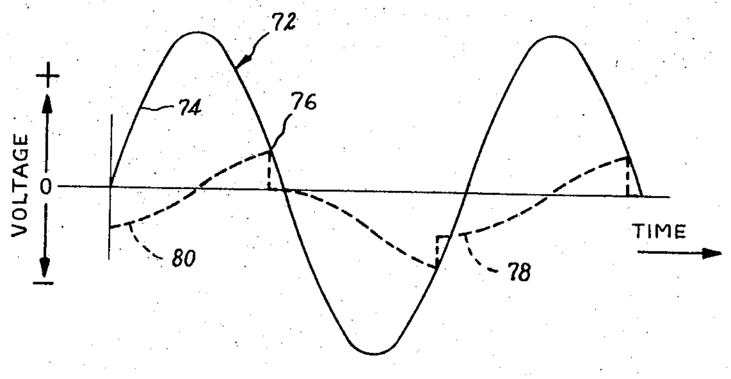
FIG. 5 is a plot similar to that of FIG. 4 showing the change of capacitor voltage when the triggered circuit operates with the Zener diode in the circuit.

The effect of this series addition to the SBS of a Zener diode is shown in the plot of the line and capacitor voltages shown in FIG. 5.

Referring now to FIG. 5, the impressed line voltage sine wave 72 will be seen to be the same as that shown in FIGS. 3 and 4. Also the initial capacitor voltage during the initial positive half-cycle will be seen to be essentially the same as that seen in FIG. 4 for the first positive half-cycle of power.

However, during the second half-cycle it will be evident that because the Zener diode has been included in series with the SBS in the circuit, the voltage which must be applied before the SBS will fire is approximately double the voltage which is necessary to fire the SBS alone, i.e., in the absence of the Zener diode. Accordingly, triggering occurs near the end of each half cycle and the premature firing of the SBS and the pop-on type of operation of the solid-state switch is precluded.

Moreover, because the Zener diode has characteristics which are in the nature of an avalanche type of conduction rather than a breakover type of conduction, the voltage through the series connection of Zener diode and SBS will not be reduced to zero but rather will be reduced to the avalanche voltage for the Zener diode. This is about equivalent to the voltage necessary to initiate conduction of the SBS in the absence of the Zener diode. Accordingly, at the start of the second positive cycle, the capacitor voltage 78 rather than being zero and showing the history of a prior pop-on type activation of the power switch as shown in FIG. 4, will be a negative voltage equivalent about to the breakdown voltage of the SBS. This has the effect of starting the charging of the capacitor at a voltage value 78 approximately equivalent to the voltage value 80 at which the initial positive cycle is shown to have started. The premature breakdown and pop-on type of performance is accordingly precluded.

The trigger angle does not swing ahead drastically after the first trigger incidence and a lamp light output, where load 14 is a lamp, becomes first noticeable at a low level due to the low hysteresis operation.

In general the Zener diode introduced into the circuits is a nonsymmetrical constant voltage drop of the same general magnitude as the trigger voltage. It is added in series with the SBS trigger in either direction to minimize the hysteresis. To varying degrees the circuit works with other bidirectional switching triggers such as a diac or a silicon symmetrical switch and for the purposes of this invention the term bidirectional trigger device is defined to include such devices as well as combination devices such as a pair of Shockley diodes connected in parallel to give a bidirectional trigger action.

In use of any of the devices serving as bidirectional trigger devices it is preferred to match the Zener voltage to the switch-back voltage of the bidirectional trigger device or to have the Zener voltage approximate that the switch-back voltage of the bidirectional trigger device.

Illustratively a Zener diode for use with an SBS should preferably have a voltage about 6 volts to match the switch-back voltage of the SBS which is approximately 6 volts. The degree to which the circuit will work with low hysteresis performance depends on the degree to which the Zener voltage approximates the switch-back voltage of the bidirectional trigger device.

It is principally at low power levels that the importance of the comparative freedom of the circuit from the pop-on or pop-off effect is manifest. This is evident in the FIGS.

An important aspect of this invention is the suitability of the combination of SBS and Zener diode for manufacture in an integrated form. One reason is that the SBS and Zener diode are both formed on the same type of base. Thus a single monolithic element can be formed to incorporate both the SBS and Zener diode.

Substantial advantage obtains from so doing because there is a distinct advantage, as noted above, in having the break over voltage of the Zener diode and the break down voltage of the SBS matched. Matching of these voltages is more readily achievable when the two components are formed as integral parts of an integrated subcircuit.

Where the two voltages are not matched firing may occur a little early in the negative half-cycle (where the Zener diode avalanche voltage is less than the SBS breakdown voltage). However even where the breakdown voltage is low the capacitor voltage is again effectively reset (as shown in FIG. 5) for the next positive half-cycle. Accordingly the substantial advantages of the invention are retained even where the SBS breakdown voltage does not match the Zener diode avalanche voltage.

We claim:

1. A firing subcircuit for a gated solid-state switch adapted for continuous control of alternating current power over a wide power range consisting essentially of a series connected capacitor and variable resistor as an RC network, said network being connected in parallel to the line supplying power through said solid-state switch, and the junction of said RC network being connected to the gate of said gated switch through a series connected bidirectional trigger device and a Zener diode.

2. The circuit of claim 1 in which the switch-back voltage of the bidirectional trigger device approximates the Zener voltage of the diode.

3. The circuit of claim 1 in which the bidirectional trigger device is an SBS.

4. The circuit of claim 1 in which the avalanche voltage of the Zener diode and breakdown voltage of the bidirectional trigger device are matched.